Feb. 25, 1930.	O. U. ZERK	1,748,819
LUBRICATING COUPLER
Filed Oct. 21, 1929
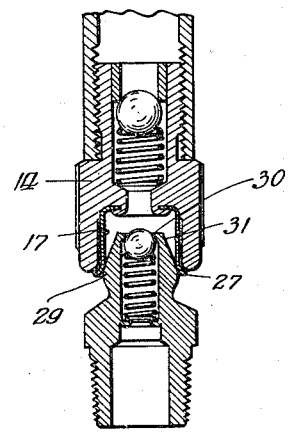
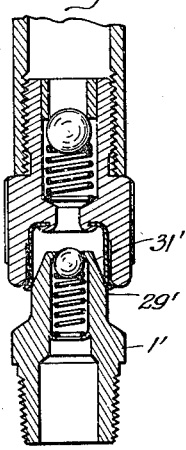
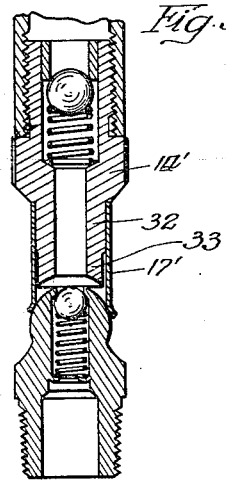
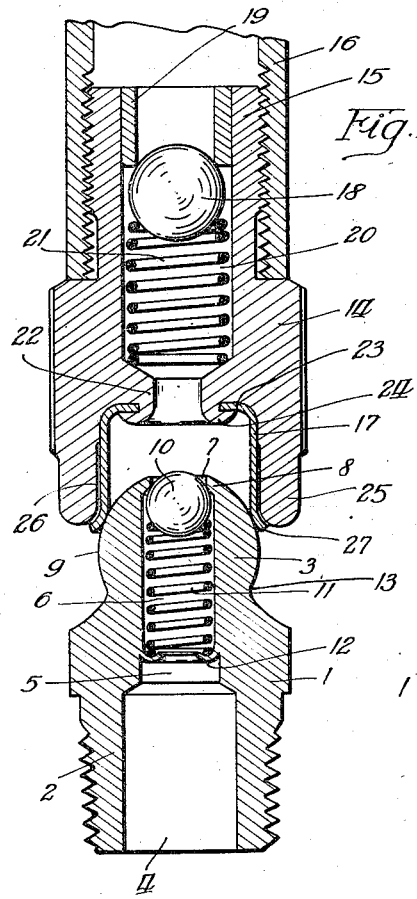
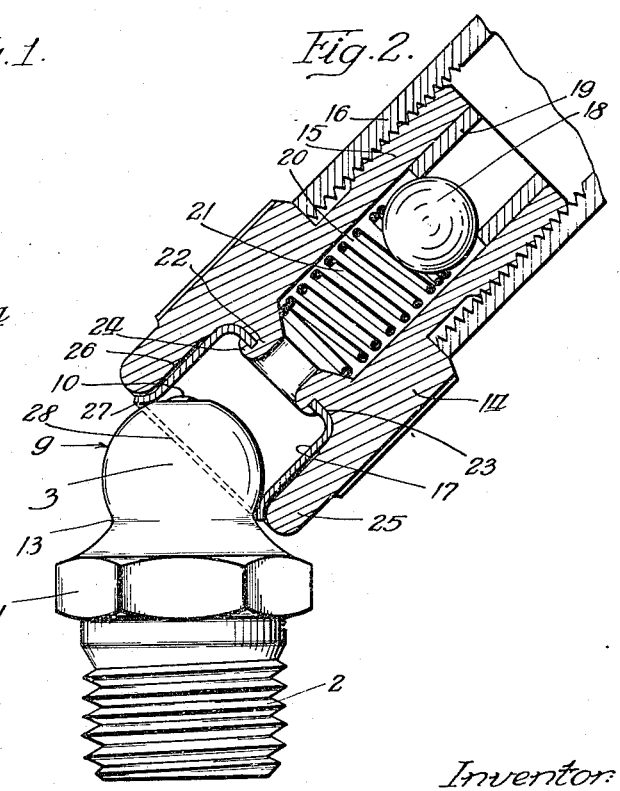
Inventor:
Oscar U. Zerk
By Slough & Canfield
Attys Patented Feb. 25, 1930

1,748,819

UNITED STATES PATENT OFFICE

OSCAR U. ZERK, OF CHICAGO, ILLINOIS

LUBRICATING COUPLER

Application filed October 21, 1929. Serial No. 401,275.

My invention relates to lubricating couplers, and more particularly relates to lubricating appliances of the class adapted for the communication of lubricant under pressure from a lubricant gun, or other source of lubricant under pressure, to bearings of mechanisms, such as the chassis bearings of automotive vehicles, the bearings of industrial machines, and the like.

In the lubrication of such bearings two general types of apparatus are commonly used: first, apparatus of the interlocking type wherein a separable coupling is employed for the purpose of temporarily relatively rigidly interlocking a nozzle of the lubricant dispensing apparatus, such as a lubricating gun, with a lubricant receiving nipple which is installed on an element of the bearing to be lubricated; second, apparatus of the contact type, wherein the nozzle and nipple are not substantially rigidly interlocked, but are simply held in lubricant communicating contact by manual effort exerted to press the nozzle against the nipple.

In my copending application, Serial No. 396,352, filed Sept. 30, 1929 (Case 11), some of the difficulties attending the production and use of prior lubricating appliances of the contact type are discussed, and in the said application improvements in nozzle and nipple construction, are disclosed whereby lubricant sealing contact may be continuously maintained by a manually directed pressure of the lubricant gun supporting the nozzle, toward the nipple under conditions wherein the gun is disposed at a considerably inclined position relative to the axis of the nipple, without requiring a considerable inclination of the nozzle itself relative to the nipple.

In the said application, this is accomplished by providing the gun closely adjacent its nozzle, which is of short length, with a lubricant communicating universal joint, which, moreover, is resiliently restorable to alignment with the gun axis after use involving angular relative deflection of the nozzle at the universal joint.

In my said application, difficulties relating particularly to the practical operation of lubricant sealing contacts of the nozzle and nipple, made commercially in quantities, wherein precisely formed parti-spherical and annular contact surfaces are theoretically required to effect a good sealing contact of the coupler elements, but which do not usually result from the manufacturing operations to which the parts are subjected. Therefore, although a considerable angularity, during the lubricating operation, may exist between the nozzle and nipple, in such prior constructions, these are objectionable due to the lack of a proper seal during most conditions of practical use.

The present application relates to lubricating couplers comprising cooperating lubricant dispensing and lubricant receiving nipples of the contact type where in the more objectionable defects in the manufacture and operation, previously had in prior couplers of the contact type are remedied, and, moreover, wherein such defects are remedied in an improved nozzle and nipple construction whereby the necessity of providing a universal joint connection, between the nozzle and the lubricant dispensing compressor, closely adjacent the nozzle, as is disclosed in the apparatus of my said copending application.

An object of my present invention, therefore, is to provide an improved coupler mechanism, comprising a lubricant dispensing nozzle and a nipple cooperating therewith, of the contact type wherein lubricant may be dispensed, without substantial loss, from the nozzle to the nipple, even these are disposed in relatively inclined positions.

Another object of my invention is to provide an improved separable coupling comprising a lubricant compressor nozzle and a lubricant receiving nipple of the contact type.

Another object of my invention is to provide an improved separable coupling comprising a lubricant compressor nozzle and a lubricant receiving nipple of the contact type, wherein the nipple engaging contacting surface of the nozzle may be provided without the necessity of a relatively expensive grinding process, to insure its proper form.

Another object of my invention is to provide an improved separable coupling comprising a lubricating nozzle and a nipple, both of the contact type, whereby lubricant may be dispensed from the nozzle to the nipple without leakage of lubricant, even though the nozzle and nipple are relatively, considerably out of axial alignment.

Another object of my invention is to provide an improved separable coupling comprising a lubricating nozzle and a nipple, both of the contact type, whereby lubricant may be dispensed from the nozzle to the nipple without leakage of lubricant, even though the nozzle and nipple are relatively, considerably out of axial alignment, and without requiring the use of a universal joint, or the like, intermediate the nozzle and the mechanism from which lubricant is dispensed thereby.

Another object of my invention is to provide an improved lubricant dispensing nozzle for a lubricating nipple of the contact type adapted to effect good lubricant sealing contact with the contact surface of the nipple even though such surface is of slightly out-of-round form.

Another object of my invention is to provide an improved highly efficient form of lubricating coupling involving separable nozzle and nipple elements, wherein a yieldable element of one of said elements responding to variations in form of different specimens of the other element, compensated therefor to effect in each case a good lubricant sealing contact between the nozzle and the engaged nipple element.

Another object of my invention is to provide a lubricant coupler having inter-engaging outer and inner nozzle and nipple elements so formed and related as to effect an extreme wedging angle of contact with the outer nozzle element of thin resilient spring metallic material, whereby when the nozzle and nipple are longitudinally pressed together, the lateral thrust effort communicated to the inner surfaces of the tubular nozzle will be greatly multiplied to so alter the form of the engaged portion of the tubular nozzle as to make it fit the form of the nipple, even though the nozzle and nipple are disposed in different angular relations.

Another object of my invention is to provide improved lubricating coupling involving separable nozzle and nipple elements wherein pressure engagement is had between the elements to effect a lubricant seal at substantially an extreme wedging angle of the engaged portions of said elements, whereby a good lubricant seal is effected between the elements with a minimum of effort.

Another object of my invention is to provide in a lubricant coupling, such as that achieving any of the foregoing objects, whereby the extreme wedging angle of contact between the elements prevents so scraping the soft material of the nipple contact surface by the nozzle element that the nipple surface will not be injured by the nozzle.

Another object of my invention is to provide a tubular nozzle and a nipple of the contact type adapted to be associated therewith with the contacting portions of both of said elements so rounded as to engage at an extreme wedging angle and whereby operative engagement between the nozzle and nipple surfaces does not injure the nipple surface, but on the contrary at each operation tends to repair injuries of said surface.

Other objects of the invention and the invention itself will be apparent from the following description of certain embodiments of my invention, wherein reference is made to the accompanying drawings illustrating the said embodiments.

In the drawings:

Fig. 1 illustrates an embodiment of my invention comprising nozzle and nipple elements of a contact type lubricating system, in longitudinal medial sectional view;

Fig. 2 illustrates the nozzle and nipple of Fig. 1 relatively angularly disposed in lubricant sealing contact, the nozzle being shown in section and the nipple in elevational view;

Fig. 3 is a view of a nozzle and nipple in longitudinal medial sectional view, the nipple comprising a variant embodiment of my invention.

Fig. 4 is a like view of a nozzle and a nipple, said nipple being another embodiment of my invention; and Fig. 5 is a like view of another embodiment of my invention, comprising a nipple and a nozzle therefor which is differently constructed from those of the other figures.

Referring now to the embodiment of my invention illustrated in Figs. 1 and 2, the nipple thereof is of tubular construction having an intermediate waist 1 of exterior hexagonal form with a reduced exteriorly threaded stem 2 projecting longitudinally therefrom and having a nozzle engaging head in the form of a parti-spherical knob 3.

The nipple is provided with a stepped longitudinal bore comprising sections 4, 5 and 6 of progressively reduced diameters, the latter terminating in an inlet opening 7 bordered by an inturned integral flange 8 of the head.

A closure for the opening 7 comprising a valve ball 10 is provided, said ball being pressed to its seat against the flange 8 by a helical spring 11 compressed between the ball and an integral inwardly extending flange 12 of the bore walls disposed intermediate the sections 6 and 5 of the bore.

The head 3 comprises an annular conversely rounded contact surface 9, which extends longitudinally of the nipple from its reduced neck 13 to the tip opening 7, and which is preferably annular on every line of cross-section. In the embodiment illustrated the surface 9 comprises, preferably, the major portion of the surface of a truncated sphere.

The nozzle comprises a body 14 having a posteriorly disposed reduced threaded stem 15 screw threaded into an end 16 of a compressor, not shown, a contactor 17 and a spring pressed valve 18.

Many different types of compressors may be used to carry out the purposes of my present invention, and I prefer those wherein, by a manual thrust exerted upon a posterior portion of the compressor, lubricant is compressed therein, and ejected through the dispensing anterior end portion, and at the same time effects lubricant sealing contact between a nipple, and a nozzle affixed to the said anterior end of the compressor. Such compressors are well known.

The valve ball is seated against a shoulder provided by a tubular insert 19 tightly fitted within the walls of the bore 20 of the nozzle body, and a helical spring 21 is compressed between the valve ball 18 and a shoulder formed by an annular flange 22 projecting inwardly from the body into said bore, in longitudinally spaced relation to the ball.

The contactor 17 is in the form of a sheet metal cup having an apertured end wall 23, secured by portions of the end wall adjacent its aperture to the nozzle body by a headed over annular projection 24 of the body, projected through said aperture.

The contactor 17 extends forwardly from its end wall 23 by substantially cylindrical tubular walls which are inwardly relieved from the embracing tubular walls 25 of the nozzle body as a result of the forwardly disposed interior walls 26 of the nozzle body being turned away to an appreciable degree providing a clearance between the nozzle body wall surface 26 and the adjacent surfaces of the lateral walls of the cup 17.

The lateral walls of the cup 17 preferably terminate at its rim in an outwardly flaring rim portion 27 providing an interiorly disposed longitudinally convex annular surface for the end of the said cup walls.

The lateral walls of the cup 17, are, preferably, made very thin, of sheet metal, preferably of a highly resilient material, such as spring brass, steel, aluminum bronze, or the like. The interior diameter of the cup walls, is less than the diameter of the parti-spherical surfaces 9 of the nipple head so that when the gun is advanced toward the nipple and the mouth of the cup 17 presented to the said parti-spherical surface thereof, the forward movement of the gun will be arrested by engagement of the annular portion 27 of the cup walls with said surface.

When such engagement occurs the manually effected pressure on the nozzle toward the nipple will cause a slight circumferential stretching of the engaged surfaces of the walls of the cup 17, against the inherent resiliency of the material of said cup walls, and due to the fact that the cup walls are sufficiently thin as to be susceptible to flexure, should the engaged surface portion 9 of the nipple head 3 depart slightly from true annularity, the thin cup walls will flex from true annular form to maintain leakproof engagement between the engaged surfaces of nozzle cup and nipple head.

Therefore, lubricant dispensed from the interior of the compressor through its tubular outlet 16 passing the ball 18 through the bore 20 of the nozzle body will, under pressure, fill the space within the cup 17 and pressing the nipple valve ball 10 from its seat be projected under pressure into the bore of the nipple and thence to the surfaces of the bearing served by said nipple.

In Fig. 2 the same apparatus as in Fig. 1 is shown, but with the nozzle body 14 and the tubular outlet 16 of the lubricant compressor disposed at a considerable angle to the axis of the nipple, but with the annular end of the lateral tubular walls of the cup 17 engaging the parti-spherical surface of the nipple to make good lubricant sealing contact therewith along an annular zone indicated by the dotted lines on Fig. 2 at 28.

The said annular zone of contact 28 is substantially broader than that which can be had between relatively rigid walls of a nozzle and of a nipple, and therefore, a better seal is effected since minute irregularities exist on either of the engaging surfaces.

Fig. 3 illustrates another embodiment of my invention, wherein the nozzle body 14 and parts associated therewith, including the thin walled contactor cup 17 engageable by an end portion 27 with a nipple, are preferably like those parts illustrated in the foregoing embodiment. The nipple, however, is not provided with a parti-spherical contact surface, its contacting surface comprising longitudinally joined annular portions which are inclined inwardly from a longitudinally convexly rounded middle surface 29 to the lubricant receiving tip end 30 of the nipple which is valved, interiorly, as in the preceding embodiment.

The surface portion of the nipple adjacent its lubricant receiving end, as indicated at 31, is of frustro-conical form and the portion 29 which is rounded on very short radii, proceeding longitudinally, is joined to the said frustro-conical surface portion by an intermediate longitudinally curved surface progressively approaching the form of a straight conical surface in portions progressively nearer and nearer to the said frustro-conical surface adjacent the end of the nipple.

The nipple of Fig. 3, therefore, provides a contacting surface adapted to be received more deeply into the mouth of the nozzle and is less susceptible to lateral displacement during the act of lubrication.

Although when the nozzle is disposed angularly to the axis of the nipple and in contact with the contacting surface thereof, formed as described, the nipple surface engaged by the portion 27 of the cup is not of true annular form, but becomes more and more egg-shaped as greater and greater angularity exists between the nozzle and the nipple, still, by the use of a circumferentially bendable, thin walled contactor of the type shown a good lubricant sealing contact is still possible due to the deforming of the cup walls, to correspond to the egg-shaped or otherwise formed engaged surface of the nipple.

The embodiment of my invention illustrated in Fig. 4 involves a nipple construction otherwise similar to that of Fig. 3, but wherein the lubricant receiving tip of the nipple having the inclined lateral surfaces 31, and to some extent a surface corresponding to that shown at 29 in Fig. 3, is joined to the hexagonal waist of the nipple by intermediate portions which are not intermediately reduced to form a neck for the head. In the embodiment of Fig 4 the hexagonal waist 1' has its outer surface merged with the surfaces 29' and 31' by substantially continuous longitudinally extending surfaces having no intermediate portion of less diameter than the more anteriorly disposed portion.

Fig. 5 illustrates another embodiment of my invention wherein a thin walled lubricant dispensing tubular contactor for the nozzle is affixed to the body 14' thereof by telescoping a posterior end of the contactor, rigidly onto an exterior surface of a reduced portion 32 of the nozzle support.

The nozzle support terminates in a still more reduced tubular end 33, and its outer surface is preferably spaced from the surrounding inner surfaces of the resilient tubular contactor 17'. The nipple illustrated in Fig. 5 is like that of Figs. 1 and 2, although nozzles having tubular contactors, like that shown at 17', in Fig. 5, may be employed in connection with nipples of forms varying from that of Figs. 1 and 2, such, for instance, as those illustrated in Figs. 3 and 4.

The various lubricant couplers above described, effect a substantially extreme wedging angle between the rounded end surfaces of the tubular nozzle, interiorly thereof, and the nozzle tip surfaces projected thereagainst. Such an extreme wedging engagement is of great advantage in a nozzle such as that described, having thin, resilient spring steel walls, or walls of like material, since the greater the wedging angle, the greater the lateral thrust effort upon the walls,—to effect a circumferential stretching action thereupon to make them conform to the form of the contact surface of the nipple. The engaged nipple contact surface, under certain conditions of angularity where a nipple not having a perfectly spherical surface is employed, may take an elliptical shape, or become egg-shaped. For instance, when the inside diameter of the thin-walled nozzle tube is made only .004 of an inch smaller than the outside diameter of the spherical nipple, when made 7/32 of an inch, outside diameter, about ten times the lateral force is exerted to tend to stretch the engaged annular portion of the nozzle tube, than is represented by the actual mechanical force exerted by the nozzle on the nipple in a longitudinal direction.

In this manner an enormous effort results to effect such a deformation of the nozzle tube as will make a perfect leak-proof contact between the nozzle and nipple surfaces.

By providing the tubular nozzle with an outwardly rounded nipple engaging portion, making contact with the nipple at substantially extreme wedging angle, scraping of the softer material of the nipple surface is avoided, which would injure such surface, and on the contrary the rounded nozzle surface effects a burnishing action on the nipple surface to polish it and in addition keeps the nipple surface in true spherical or other annular form, and removes irregularities in the surface which occur through faulty manufacturing methods, or injuries to the surface caused by the stones or the like striking the nipple.

Having thus described my invention in certain embodiments, I am aware that numerous and extensive departures may be made from the said embodiments, but without departing from the spirit of my invention.

I claim:

1. A lubricating nozzle having thin tubular walls of inherently resilient material, a nipple having a terminal knob with a rounded outer surface and an inlet opening therethrough, said tubular walls directly universally engageable with said surface and adapted to be outwardly deflected thereby to conform to the form thereof.

2. A lubricating nozzle, a lubricant receiving nipple, said nozzle terminating in tubular walls, and a nipple having a lubricant receiving bored head with an end opening, and a rounded outer surface extending divergingly substantially from said opening, and partially telescopable into said walls, to make direct wedging engagement therewith, said walls being laterally deformable responsive to such engagement to conform to the engaged surface of the nipple head.

3. A lubricating coupler comprising a nipple, a nozzle, said nipple terminating in a knob longitudinally bored for passage of lubricant, the bore terminating in a convexly rounded surface of the knob, said nozzle having an outlet connector tube having yieldable lateral walls directly engageable by an inner edge with said convex surface when seated, to deflect said walls to effect sealing engagement between said walls and said surface.

4. A lubricating coupler comprising a nipple, and a nozzle, said nipple terminating in a knob bored longitudinally for passage of lubricant, the bore terminating in a substantially parti-spherical portion of the knob surface, an outlet tube for said nozzle having yieldable lateral walls directly engageable by a forwardly disposed inner portion, with the said knob surface portion seated, and laterally deflectible thereby to fit said surface portion.

5. A lubricating coupler comprising a nipple, and a nozzle, said nipple terminating in a knob bored longitudinally for passage of lubricant, the bore terminating in a substantially convex portion of the knob surface, an outlet tube for said nozzle, having yieldable lateral walls directly engageable by a forwardly disposed inner surface portion when seated, to deflect said walls to effect sealing engagement between said walls and said surface, in a plurality of angularly different dispositions of said nozzle and nipple.

6. A lubricating coupler comprising a nipple, a nozzle, said nipple terminating in a knob longitudinally bored for passage of lubricant, the bore terminating in a convexly rounded surface of the knob, said nozzle having an outlet connector tube having yieldable lateral walls directly engageable by an inner edge with said convex surface, to deflect said walls to effect sealing engagement between said walls and said surface when seated, and a lubricant communicating nozzle element supporting said tube, having a tubular protective extension surrounding said walls.

7. A lubricating coupler comprising a nipple, and a nozzle each having longitudinally extending lubricant passages therethrough, the nipple passage terminating centrally of an end wall, said nipple having a surface extending divergently from the terminal of said passage, in a general longitudinal direction, said nozzle having an outlet connector tube having yieldable lateral walls directly engageable by an inner edge with said surface when seated, to deflect said walls to effect sealing engagement between said walls and said surface.

8. A lubricating mechanism, a lubricant dispensing nozzle therefor, a tubular dispensing element having thin lateral walls of inherently resilient metallic material for said nozzle, and secured at an inner end thereto, a nipple having a terminal knob with a rounded outer surface and an inlet opening therethrough, said tubular walls directly universally engageable by an outer end with said surface and adapted to be outwardly deflected thereby to conform to the form thereof.

9. A lubricating mechanism, a lubricant dispensing nozzle therefor, a tubular dispensing element having thin lateral walls of inherently resilient metallic material for said nozzle, and secured at an inner end thereto, a nipple having a terminal knob with a rounded outer surface and an inlet opening therethrough, said tubular walls directly universally engageable by its outer end with said surface and adapted to be outwardly deflected thereby to conform to the form thereof, and a tubular protecting element for said nozzle surrounding said tubular dispensing element.

10. A lubricating mechanism, a lubricant dispensing nozzle therefor, a tubular dispensing element having thin lateral walls of inherently resilient metallic material for said nozzle, and secured at an inner end thereto, a nipple having a terminal knob with a rounded outer surface and an inlet opening therethrough, said tubular walls directly universally engageable by an outer end with said surface and adapted to be outwardly deflected thereby to conform to the form thereof, and a tubular protecting element for said nozzle surrounding said tubular dispensing element, said protecting tube being but slightly spaced from the outer surfaces of the inner tubular element, and adapted to restrain extreme improper lateral movements to said inner tubular element.

11. A lubricating mechanism, a lubricant dispensing nozzle therefor, a tubular dispensing element having thin lateral walls of inherently resilient metallic material for said nozzle, and secured at an inner end thereto, a nipple having a terminal knob with a rounded outer surface and an inlet opening therethrough, said tubular walls directly universally engageable by an outer end with said surface and adapted to be outwardly deflected thereby to conform to the form thereof, and a substantially rigid tubular protecting element integral with said nozzle, surrounding said tubular dispensing element.

12. A lubricating mechanism, a lubricant dispensing nozzle therefor, a tubular dispensing element having thin lateral walls of inherently resilient metallic material for said nozzle, and secured at an inner end thereto, a nipple having a terminal knob with a rounded outer surface and an inlet opening therethrough said tubular walls directly universally engageable by its outer end with said surface and adapted to be outwardly deflected thereby to conform to the form thereof, and a substantially rigid tubular protecting element integral with said nozzle, surrounding said tubular dispensing element, said protecting tube being but slightly spaced from the outer surfaces of the inner tubular element and adapted to restrain extreme improper lateral movements to said inner tubular element.

13. A lubricating coupler comprising a tubular nozzle of thin inherently resilient spring metallic material and a substantially parti-spherical nipple element, the nipple element adapted to be partially received within an end of the nozzle element and formed with inclined contact surfaces to make substantially extreme wedging engagement with an inner portion of said end, upon a longitudinal thrust effort of the nozzle against the nipple.

14. A lubricating coupler comprising a tubular nozzle element and a substantially parti-spherical nipple element, said nozzle element making suction wedging engagement with said nipple element, as to effect a larger lateral pressure between the two elements directly responsive to longitudinal pressure exerted by the nozzle element against the nipple element, than the amount of such longitudinal pressure.

15. A lubricating coupler having co-operative nozzle and nipple elements, one having a bored substantially parti-spherical contact surface, the other comprising a thin-walled resilient metallic tube, the first partly receivable within the other, and said other adapted to be directly resiliently outwardly expanded thereby to effect a lubricant seal between the elements.

16. A lubricating coupler having co-operative nozzle and nipple elements, one having a bored substantially parti-spherical contact surface, the other comprising a thin-walled resilient metallic tube terminating in an outwardly flared rounded end, the first partly receivable within the flared end of the other and engageable therewith, and directly resiliently outwardly expanding it to effect a resilient seal between the elements.

In testimony whereof I hereunto affix my signature this 19 day of October, 1929.

OSCAR U. ZERK.